United States Patent
Shepherd et al.

(10) Patent No.: US 7,338,201 B2
(45) Date of Patent: Mar. 4, 2008

(54) METHOD OF ESTIMATING THE TEMPERATURE OF THE AIR IN THE INTERNAL CAVITY OF A TIRE AND APPLICATION TO THE DETECTION OF ABNORMAL OPERATING OF A RUNNING-FLAT SYSTEM

(75) Inventors: Russell Shepherd, Clermont-Ferrand (FR); Richard Abinal, Veyre-Monton (FR); Eric Berger, Loubeyrat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 7 days.

(21) Appl. No.: 11/316,571

(22) Filed: Dec. 22, 2005

(65) Prior Publication Data

US 2006/0193368 A1 Aug. 31, 2006

Related U.S. Application Data

(60) Division of application No. 10/826,129, filed on Apr. 16, 2004, now Pat. No. 7,043,973, which is a continuation of application No. PCT/EP02/11502, filed on Oct. 15, 2002.

(30) Foreign Application Priority Data

Oct. 18, 2001 (FR) .................................. 01 13624

(51) Int. Cl.
*G01K 13/00* (2006.01)

(52) U.S. Cl. ............................ 374/1; 374/153; 374/142
(58) Field of Classification Search ................. 374/1, 374/142, 153

See application file for complete search history.

(56) References Cited

U.S. PATENT DOCUMENTS

| | | | | | |
|---|---|---|---|---|---|
| 4,150,567 | A | * | 4/1979 | Prevorsek et al. | ............. 73/146 |
| 4,673,298 | A | * | 6/1987 | Hunter et al. | ................ 374/122 |
| 5,050,110 | A | * | 9/1991 | Rott | ........................... 702/130 |
| 5,140,851 | A | * | 8/1992 | Hettich et al. | ............. 73/146.5 |
| 5,353,020 | A | * | 10/1994 | Schurmann | ............ 340/870.31 |
| 5,827,957 | A | * | 10/1998 | Wehinger | .................. 73/146.3 |

(Continued)

FOREIGN PATENT DOCUMENTS

JP 2006044497 A * 2/2006

(Continued)

*Primary Examiner*—Gail Verbitsky
*Assistant Examiner*—Mirellys Jagan
(74) *Attorney, Agent, or Firm*—Fitzpatrick, Cella, Harper & Scinto (57) ABSTRACT

A method of estimating the temperature of the air in the internal cavity of a tire in which:
  prior to normal operation, a series of running tests are carried out on the tire provided with a means of measuring the internal air temperature at given speeds V and external temperatures $T_{amb}$, the tire supporting a given load and the cavity being at a given internal relative pressure, and an adjustment is made to a function giving the temperature of the internal air $T_{ai}$ according to the parameters of speed and external temperature; and
  in normal operation, the tire equipping a vehicle under the above conditions of load and relative pressure, the internal air temperature is estimated according to the speed of the vehicle and the temperature external to the vehicle.

The method ia applied to the detection of abnormal operating in particular of a running-flat system.

4 Claims, 7 Drawing Sheets

U.S. PATENT DOCUMENTS

| | | | |
|---|---|---|---|
| 5,895,846 A * | 4/1999 | Chamussy et al. | 73/146.2 |
| 6,704,636 B2 * | 3/2004 | Amano et al. | 701/80 |
| 2001/0022551 A1 * | 9/2001 | Barnett | 340/442 |
| 2002/0010537 A1 * | 1/2002 | Yamaguchi et al. | 701/80 |
| 2002/0036567 A1 * | 3/2002 | Larson | 340/442 |
| 2004/0050151 A1 * | 3/2004 | Kojima | 73/146 |
| 2005/0160805 A1 * | 7/2005 | Taki | 73/146 |
| 2005/0235744 A1 * | 10/2005 | Ogawa | 73/146 |

FOREIGN PATENT DOCUMENTS

WO     WO 01-17806 A1     3/2001

* cited by examiner

METHOD OF ESTIMATING THE TEMPERATURE OF THE AIR IN THE INTERNAL CAVITY OF A TIRE AND APPLICATION TO THE DETECTION OF ABNORMAL OPERATING OF A RUNNING-FLAT SYSTEM

CROSS-REFERENCE TO RELATED APPLICATIONS

This application is a division of U.S. patent application Ser. No. 10/826,129, filed Apr. 16, 2004 now U.S. Pat. No. 7,043,973, which is a continuation of International Application No. PCT/EP02/11502, filed Oct. 15, 2002 and published as WO 03/035414 in the French language on May 1, 2003, which claims priority to French National Application No. 01/13624, filed Oct. 18, 2001.

BACKGROUND OF THE INVENTION

The object of the invention is a method of estimating the temperature of the air in the internal cavity of a tire whilst running and the application of this method to the detection of an abnormal operating of a tire and a running-flat system.

It is known that temperature is an important parameter for the operating of rubber objects because of the appreciable variations in the physical and mechanical properties of these objects according to this temperature. With regard to tires, the temperature of the air in the internal cavity defined by the wheel and the tire is an important indicator of the operating conditions of the tire. It is in addition not always very easy to measure this temperature whilst running and a requirement exists to be able to estimate it reliably.

SUMMARY OF THE INVENTION

The object of the invention is a method of estimating the temperature of the air in the internal cavity of a tire in which:
  prior to normal operation, a series of running tests are carried out on the tire provided with a means of measuring the temperature of the air in the cavity at given speeds V and external temperatures $T_{amb}$, the tire supporting a given load and the cavity being at a given internal relative pressure, and an adjustment is made to a function giving the temperature of the internal air $T_{ai}$ according to the parameters of speed and external temperature:

$T_{ai}=F(V,T_{amb})$;

in normal operation, the tire equipping a vehicle under the above conditions of load and relative pressure in the cavity, the temperature of the internal air in the cavity is estimated according to the speed of the vehicle and the temperature external to the vehicle.

By way of preferential example, the internal temperature $T_{ai}$ can be given by:

$$T_{ai,n} = T_{SS} - (T_{SS} - T_{ai,n-1})\exp\left(\frac{4}{\tau}(t_n - t_{n-1})\right)$$

with: $T_{ai,n}$, internal temperature estimated at time $t_n$; $T_{ai,n-1}$, internal temperature estimated at time $t_{n-1}$; $T_{ss}$, internal temperature at thermal equilibrium under the given test conditions; $\tau$, adjustment coefficient; and $T_{ss}=(a+bT_{amb})V^{(c+T_{amb}d)}+T_{amb}$ where a, b, c and d are adjustment coefficients.

It is advantageous to carry out the running tests under conditions such that the relative pressure in the cavity corresponds, when cold, to the normal relative pressure of the tire.

Such estimation could in particular be useful in the case of the operating of systems for running flat. In this case, it is advantageous to carry out the running tests under conditions of running flat, that is to say with a substantially zero relative pressure in the tire cavity.

The above method of estimating the temperature of the air in the internal cavity of a tire when running may have many applications. Amongst these the detection of abnormal operating of a tire under running conditions, normal or running flat, is particularly advantageous.

It is known that the reduction in relative pressure of a tire may be abrupt, for example following a burst, or very slow, for example after a puncture, but in all cases there is a risk of accident through loss of control of the vehicle steering. So-called "running-flat" devices have been conceived, which generally comprise an annular safety support mounted inside the tire in order to limit the sagging of the latter and possibly to prevent the phenomenon of unwedging, that is to say the movement of a tire bead towards the inside of the rim, which causes the tire to come off the rim.

Such a device is described, for example, in the patents WO 94/13498 and EP 0 796 747 (Michelin et Cie).

Tires have also been conceived whose structure, in particular of the sidewalls, is strongly reinforced to enable them to run at low relative pressure or at zero relative pressure. One example of such tires, known as "self-supporting", is given in the patent U.S. Pat. No. 6,026,878.

Paradoxically, these modern running-flat devices are so effective that the driver does not easily perceive the drop in relative pressure of one of the tires on his vehicle. These systems must therefore comprise apparatus for measuring the relative pressure of the tires, whose essential function is to warm the driver as soon as the relative pressure in a tire drops below a predetermined threshold.

These systems for running flat, based on the use of means of supporting the tire tread in the event of deflation of the cover disposed in or outside the tire currently allow running, according to the tire manufacturers, under running-flat conditions at limited speed (around 80 km/hour at a maximum) and for a distance which is also limited (around 200 km).

These range values are values determined under very severe conditions in order to guarantee the safety of the users when running flat. It may however be useful to supplement these average values by informing the driver of a vehicle of abnormal operating of a running-flat system.

The object of the invention is a method of detecting abnormal operating of a running-flat system equipping a vehicle, the system comprising, for each wheel, a tire forming with the wheel a cavity, a means of detecting the internal temperature of the cavity, a means of estimating this internal temperature of the cavity and means for generating and transmitting an alarm. This method is such that, in normal operation:
  the internal temperature $T_n$ in the cavity is measured periodically;
  the internal temperature $T_{ai}$ is estimated periodically;
  the measured temperature and the estimated temperature are compared; and
  an alarm is triggered when the result of this comparison is higher than a given threshold.

According to a simple embodiment, the internal temperature is measured according to the speed V of the vehicle and the temperature $T_{amb}$ external to the vehicle:

$$T_{ai}=F(V,T_{amb})$$

The function F is preferably determined from a series of running-flat tests on the tire at given speeds V and external temperatures $T_{amb}$, the tire supporting a load equal to its normal maximum load and the cavity being substantially at zero relative pressure.

This series of tests therefore takes place under the most severe conditions expected for the tire with regard to the load and relative pressure within the cavity of the tire. For this purpose, the inflation valve can for example be removed.

An example of the function F may be:

$$T_{ai,n} = T_{SS} - (T_{SS} - T_{ai,n-1})\exp\left(\frac{4}{\tau}(t_n - t_{n-1})\right)$$

with: $T_{ai,n}$, internal temperature estimated at time $t_n$; $T_{ai,n-1}$, internal temperature estimated at time $t_{n-1}$; $T_{ss}$, internal temperature at thermal equilibrium under the given test conditions; $\tau$, adjustment coefficient; and $$T_{ss}=(a+bT_{amb})V^{(c+T_{amb}d)}T_{amb}$$

where a, b, c and d are adjustment coefficients.

The estimation of the internal temperature may in addition use the value of the load Q supported by the tire. The tests for determining the corresponding function F then include this load Q as an additional parameter for the test. This substantially improves the accuracy of the estimation of the temperature of the internal air in the tire cavity.

It is also possible to use in addition the value of the relative inflation pressure P of the tire. The tests for determining the function F then also include this parameter P.

According to the method according to the invention, an alarm can be triggered as soon as the estimated temperature $T_{ai}$ exceeds the measured temperature $T_n$ by a given threshold. This threshold can be around 10 degrees Celsius.

The method according to the invention makes it possible to warn the driver as soon as the running-flat system used is not operating under the conditions provided for by the tire manufacturer. This may for example occur when the vehicle is very overloaded or when, for any reason, the quantity of lubricant present in the cavity for facilitating the flat running is not correct, or when, following a repair for example, the internal surface of the tire has its properties modified by a repair solution etc.

This method also makes it possible to warn the driver at the end of the normal service life of the running-flat system. Under these circumstances, at the end of the service life, a marked increase in the temperature of the internal air in the cavity is often observed. This heating becomes significant and can be interpreted unambiguously by monitoring the measured and estimated temperatures. The fact that the measured temperature substantially exceeds the estimated temperature, under stable running conditions, can be interpreted as a degradation in the operating of the running-flat system, information which must then be transmitted to the driver of the vehicle without delay.

The system preferably also comprises a warning device for the deflation of the cavity and the method of detecting abnormal operating according to the invention is triggered as from the time that this warning device has detected a predetermined deflation threshold.

The tire is preferably provided with structural reinforcement means. These can be a safety support externally disposed radially relative to the wheel rim and intended to support the tire tread in the event of relative inflation pressure.

They can also be inserted in the tire structure.

Another object of the invention is a device for detecting abnormal operating of a running-flat system intended to equip a vehicle, the system comprising, for each wheel, a tire forming a cavity with the said wheel and comprising:
  a means of measuring the internal temperature in the cavity,
  a means of estimating the internal temperature,
  a means of comparison between the measured internal temperature and the estimated internal temperature, and
  means for generating an alarm and transmitting it to the driver.

This device is adapted for generating an alarm in normal operation when the result of the said comparison satisfies a given relationship.

Another object of the invention is a similar method applied to a tire intended to equip a vehicle. In this application, as before, it is possible to estimate the internal temperature according to the speed of the vehicle and the temperature external to the vehicle.

Likewise, prior to normal operation, the function F is determined from a series of running tests on the tire at given speeds V and external temperatures $T_{amb}$, the tire supporting a load corresponding to the normal maximum load and the cavity being, when cold, at an internal relative pressure corresponding to the normal relative pressure.

This method thus has the advantage of indicating abnormal operating related to excessive heating of the internal cavity of the tire and the prior tests are indeed carried out at recommended normal inflation relative pressures rather than at pressures close to zero relative pressures.

BRIEF DESCRIPTION OF THE DRAWINGS

The methods and devices according to the invention will now be described further, taking as an example the application to the detection of abnormal operating of a running-flat system, with the help of the accompanying drawing, in which.

DETAILED DESCRIPTION

All the tests described below were carried out on a Renault "Scenic" vehicle equipped with a "PAX" running-flat system from Michelin comprising a rubber safety support.

Figure 2:
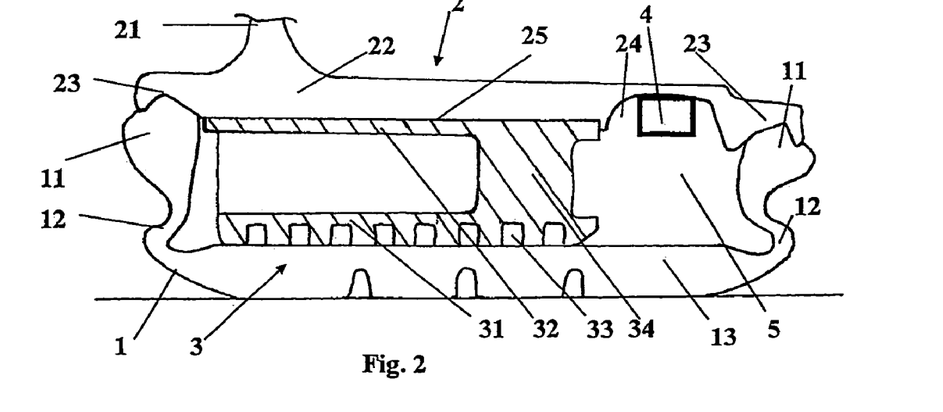
FIG. 2 is an axial section of the support in FIG. 1 mounted on a wheel rim and in abutment against a tire.
Figure 3:
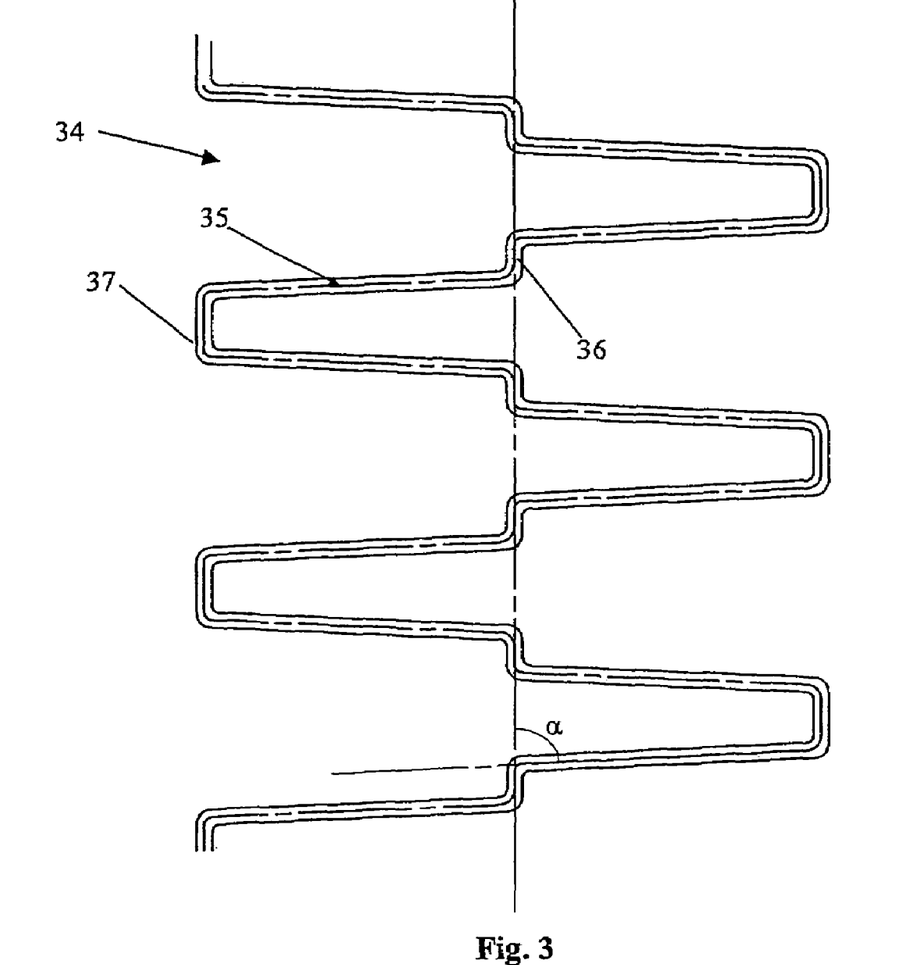
FIG. 3 is a section AA as indicated in FIG. 1 of a safety support.
Figure 4:
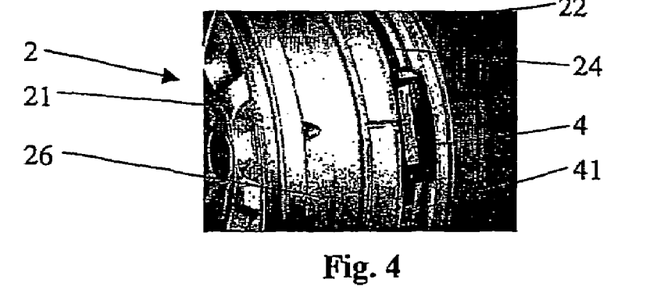
FIG. 4 presents the installation of a warning device on a wheel.

FIGS. 1 to 4 illustrate the PAX running-flat system. This system comprises a tire 1 (FIG. 2), a wheel 2 (FIGS. 2 and 4), a safety support 3 (FIGS. 1, 2 and 3) and a device for warning of the deflation of the internal cavity defined by the tire and wheel with, for each wheel, a wheel module 4 disposed in the internal cavity 5 of the tire (FIG. 4);

The tire 1 comprises two beads 11, two sidewalls 12, and a tread 13. This tire 1 is described in particular in the patent application WO 00/41902. The size used in the tests is 195-620R420 Spaicity. The tire 1 is adapted to be mounted on a wheel 2 with a disc 21 (FIG. 4) and a rim 22 (FIG. 2). The rim 22 comprises two seats 23, a mounting groove 24 and a support surface 25 for the safety support. The wheel 2 used in the test is illustrated in FIG. 4. The rim of this wheel has a support surface 25 for the safety support 3 with a circumferential lightening groove 26 as presented in the patent application WO 00/5083. As illustrated by FIGS. 2 and 4, the wheel module 4 is placed in the mounting groove 24 and fixed by a rigid band 41 surrounding this mounting groove 24. The wheel module used is a SmarTire Generation I. This module includes a pressure sensor and a temperature sensor. It is this module which was used in all the tests for measuring the internal temperature in the cavity 5.

Figure 1:
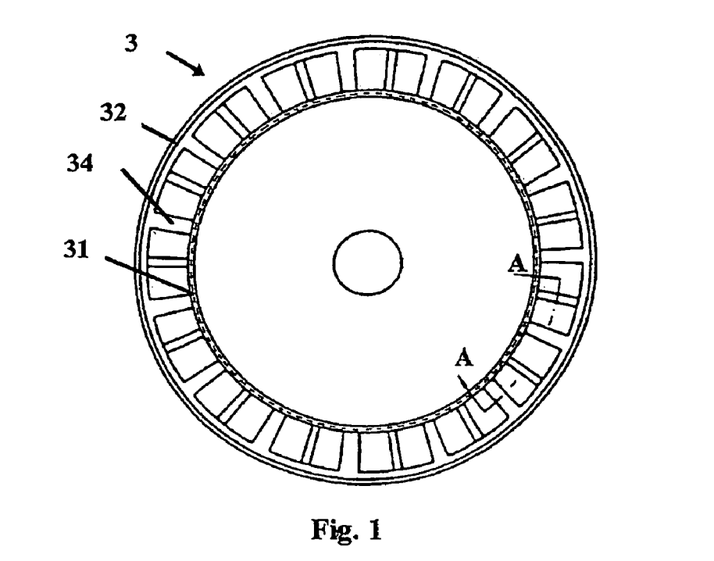
FIG. 1 is a side view of a safety support.

FIG. 1 presents a side view of the safety support 3 of the PAX system. This support comprises essentially three parts: a base 31, annular in shape overall, a top 32, substantially annular, with, on its radially external wall (optionally), longitudinal grooves 33 and an annular body 34 for connection between the base 31 and the top 32. FIG. 3 presents a particular embodiment of the annular body 34 as used in the tests. FIG. 3 is a section AA as presented in FIG. 1. The annular body 34 is circumferentially continuous. It comprises partitions 35 extending on each side of the support with a substantially circumferentially oriented central part 36. The partitions 35 are inclined at an angle α relative to the circumferential direction. This angle is close to 80 degrees. The partitions are thus close to an axial orientation. The partitions 35 are connected together in an alternating fashion by circumferentially oriented connections 37. Such a safety support is described in the patent application WO 00/76791 (the embodiment in FIG. 5 of this application). The characteristics of the safety supports used are: 115-420(45); 115 is the width of the support, 420 the nominal diameter of the corresponding tire and rim and 45 the height of the support; all these dimensions are in millimeters. These supports are essentially produced from rubber material.

FIG. 2 illustrates the operating of the PAX system during running flat. When the pressure of the air in the internal cavity decreases greatly and approaches atmospheric pressure, the tread comes into abutment against the radially external wall of the safety support and it is this safety support which will progressively support an increasing proportion of the load applied to the wheel. It is then said that the running is "flat running". When the pressure in the internal cavity becomes identical to atmospheric pressure, it is said that the "relative pressure" in the internal cavity is zero.

This figure illustrates clearly that, in running-flat condition, friction is observed between the tire tread and the top of the safety support. This friction is liable to cause significant heating. To control this heating, a lubrication gel is usually included in the internal cavity of the tire. This lubrication gel can be disposed on the surface of the top of the safety support or in adapted reservoirs such as the one disclosed by the application WO 01/28789.

Figure 5:
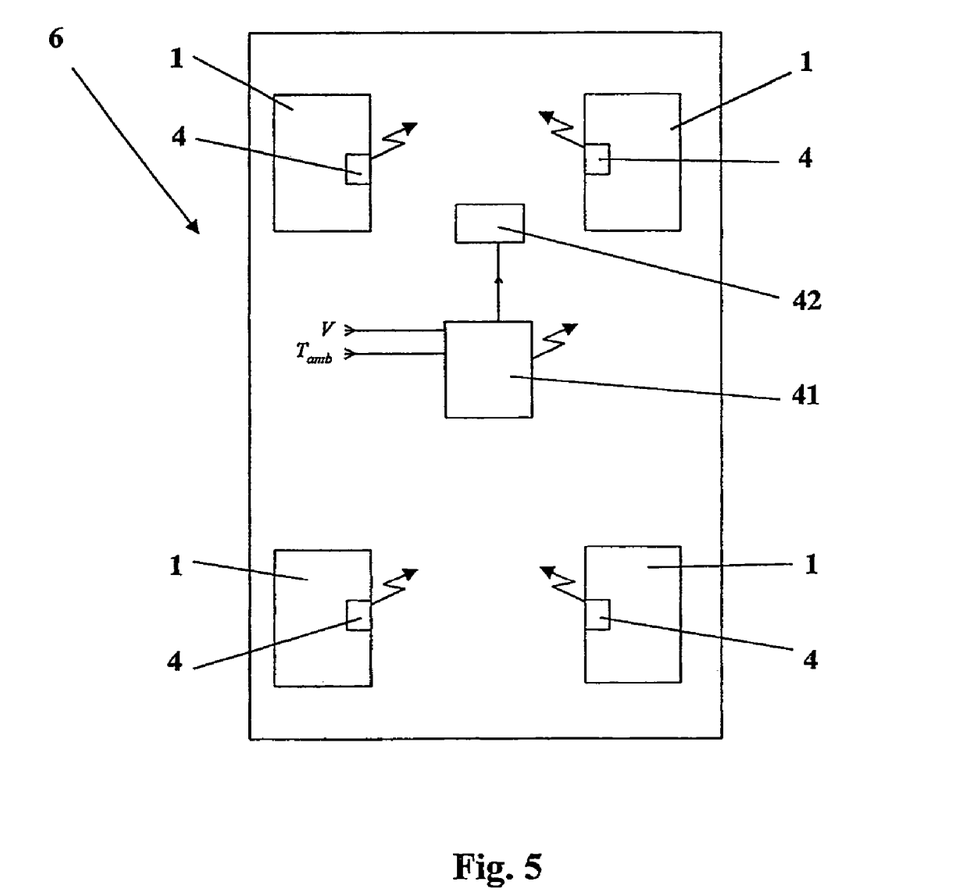
FIG. 5 presents a diagram for the installation of a device according to the invention in a vehicle.

FIG. 5 presents a scheme for installing the device according to the invention in a vehicle 6. The vehicle 6 comprises four tires 1. The vehicle is equipped with a tire deflation warning device. This warning device comprises a wheel module 4 disposed in each tire/wheel assembly on the vehicle, a central unit 41 disposed in the chassis of the vehicle 6 and a display 42 disposed in the vehicle cabin. The wheel modules are disposed in the tire/wheel assemblies of the vehicle so as to be in contact with the internal cavity 5 of the tires (see FIGS. 2 and 4). These modules comprise in particular pressure and temperature sensors. The wheel modules 4 and the central unit 41 are equipped with data transmission means such as radio transceivers and their associated antennae. These radio transceivers permit the transfer of the data measured by the temperature and pressure sensors included in the wheel modules 4 to the central unit 41. The central unit 41 comprises means of processing the data received, such as a microcomputer. This computer is programmed to identify the origin of the radio signals transmitted by the wheel modules, to store the pressure and temperature values received, to process them, to generate alarms if necessary and to transmit them to the display 42 so that they are brought to the knowledge of the driver of the vehicle. In the case of the device according to the invention, the central unit is also connected to the vehicle odometer and to an external temperature sensor disposed on the vehicle chassis. It thus regularly receives the values of the vehicle speed V and temperature $T_n$ external to the vehicle.

Figure 6:
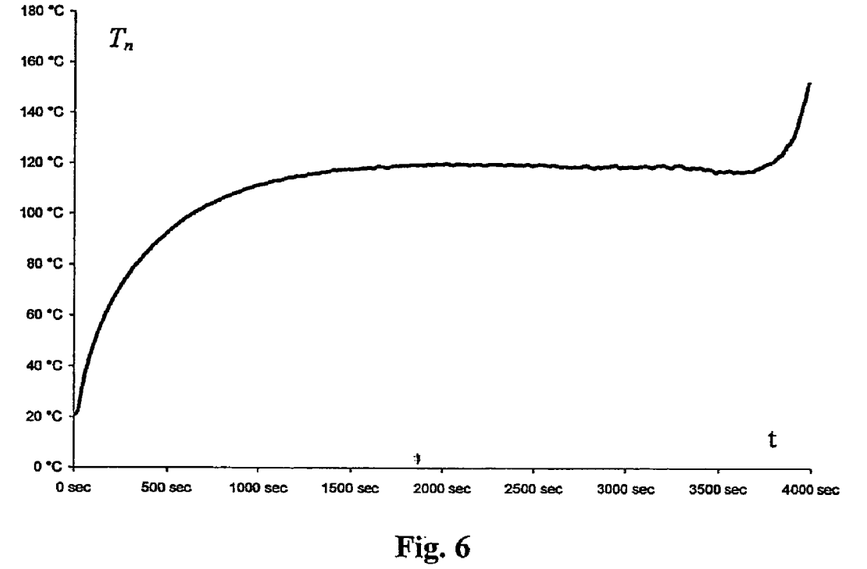
FIG. 6 presents the change in internal temperature of a PAX system when running flat.

FIG. 6 presents a conventional change in the temperature of the air in the internal cavity of the tire or "internal temperature" during a running-flat test on the test run under very severe conditions. The graph presents the change in the temperature $T_n$ as a function of the duration of the test t. After high initial heating, around 80 degrees Celsius, the temperature stabilizes. At the end of the test, a strong rise in the temperature is once again noted, which testifies to irreversible damage to the safety support. The support is then no longer in a state to fulfill its functions.

Figure 7:
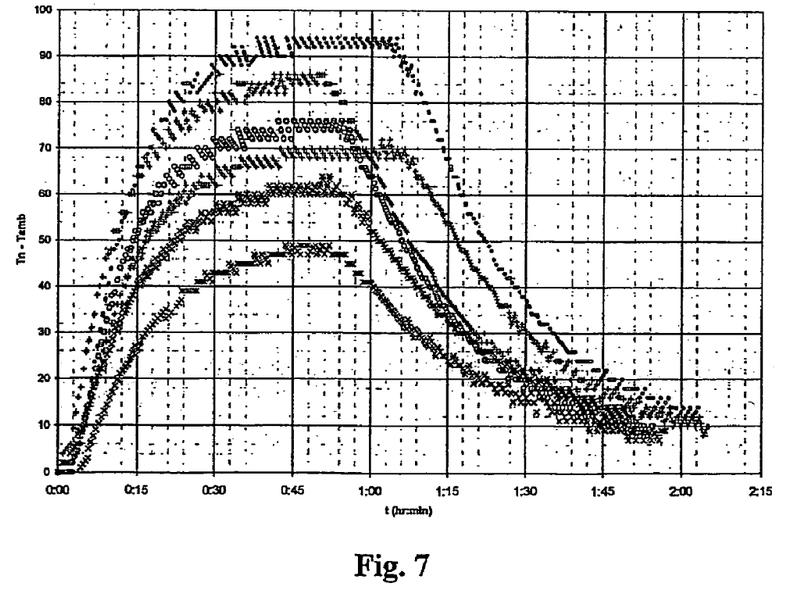
FIG. 7 presents the changes in internal temperature of a PAX system during analytical tests under various conditions.

In order to be able to empirically determine the temperature of the internal air in the cavity of the tire under running-flat conditions, a series of analytical tests were carried out on the test run at variable applied speeds V, external temperatures $T_{amb}$ and loads Q. FIG. 7 illustrates the results obtained. On the X-axis, the graph presents the duration of the test and on the Y-axis the measured difference between the internal temperature in the cavity and the external temperature: $T_n - T_{amb}$.

The tests were carried out until the thermal stabilization temperature $T_{ss}$ of the internal air was reached and were then stopped. High heating is therefore observed as illustrated in FIG. 6, and then a stabilized temperature phase followed by a decrease. All the results obtained at a maximum applied load Q can be modeled thus:

$$T_{ss}=(a+bT_{amb})V^{(c+T_{amb}d)}+T_{amb}$$

with: $T_{ss}$, internal temperature at thermal equilibrium under the given test conditions, $T_{amb}$, temperature outside the tire, V, running speed and a, b, c and d adjustment coefficients.

For the PAX system tested, the values of the coefficients are as follows:
a=11.9734° C.hr/km, b=−0.03152 hr/km, c=0.4852 and d≈0. (hr is the abbreviation of hour, km of kilometer, ° C. of degrees Celsius).

It is thus possible to estimate the temperature of the internal air during transient heating and cooling phases by means of the equation:

$$T_{ai,n} = T_{SS} - (T_{SS} - T_{ai,n-1})\exp\left(\frac{4}{\tau}(t_n - t_{n-1})\right)$$

with: $T_{ai,n}$, estimated internal temperature at time $t_n$; $T_{ai,n-1}$ estimated internal temperature at time $t_{n-1}$; $\tau$, adjustment coefficient.

The coefficient $\tau$ characterizes principally the time necessary for obtaining thermal equilibrium and has the value:

$\tau$=40 min when $T_{ss}>T_{ai,n}$ $\tau$=130 min when $T_{ss}<T_{ai,n}$ (min being the abbreviation of minute).

It should be noted that thermal equilibrium takes appreciably longer to achieve during cooling than during heating.

Figure 8:
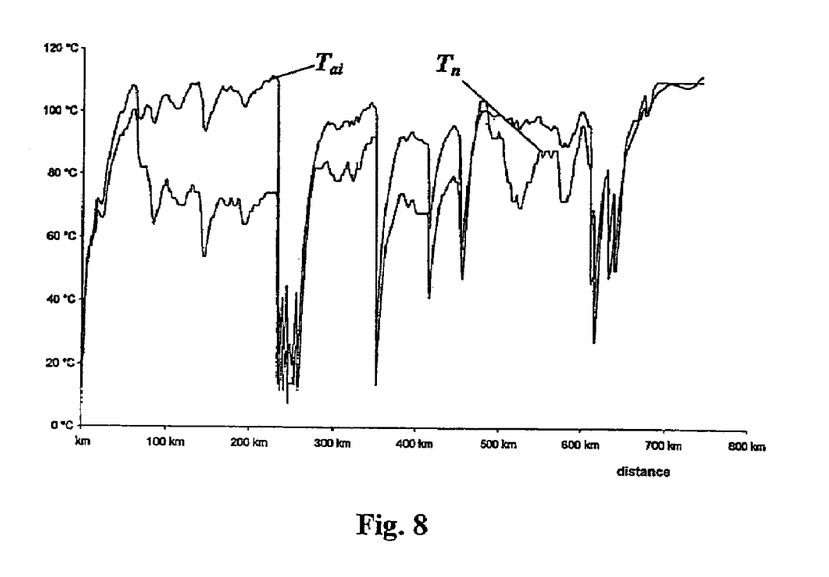
FIG. 8 presents a comparison between measured and estimated internal temperature during a test of a PAX system when running flat.

FIG. 8 presents the changes in the estimated and measured temperatures during running-flat tests of long duration. On the X-axis is the distance traveled, on the Y-axis the temperatures $T_n$ (measured) and $T_{ai,n}$ (estimated). The total length traveled by the vehicle is around 750 km. It should be noted that the estimated temperatures are practically routinely substantially higher than the measured temperatures. This is related principally to the fact that the tests taken into account for establishing the empirical model are tests carried out at the maximum load Q for the tire in question, whilst the running tests were carried out at variable loads. Another reason may also be the inaccuracy of the temperature measurement sensor.

It is of course possible to improve the accuracy of the estimation of the internal temperature by taking account of the actual load applied to the tire during analytical tests, but also during running-flat tests.

The simplified model does however have a very important application in terms of operating safety; it makes it possible to check at all times that the operating of the running-flat system, here the PAX system, is normal.

Figure 12:
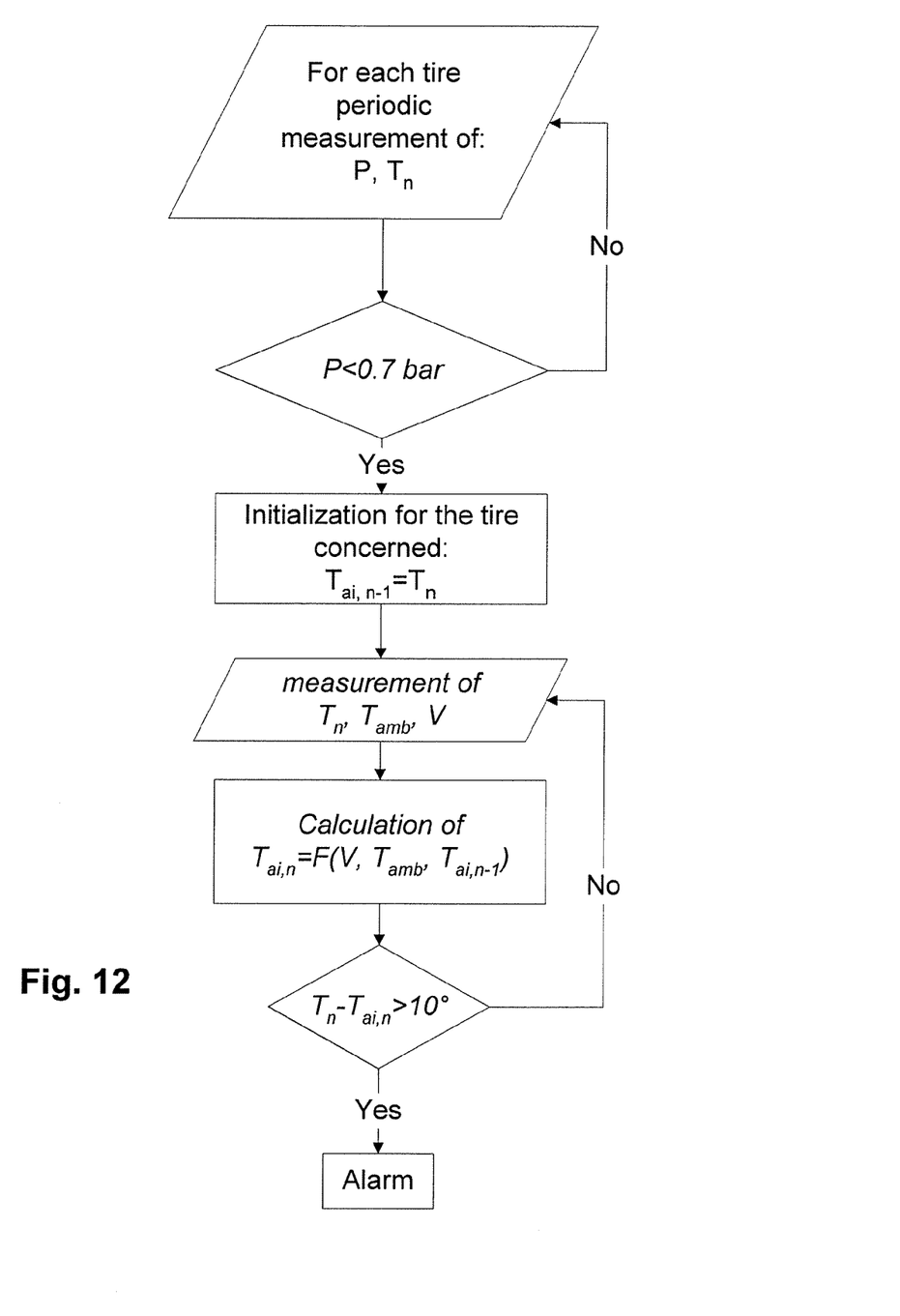
FIG. 12 presents a simplified diagram of an example of the method of detecting abnormal operating of a running-flat system.

FIG. 12 presents a simplified diagram of the method of detecting abnormal operating of a running-flat system. As soon as the vehicle is started, the deflation warning device periodically measures, for each tire, the relative pressure and the temperature of the internal air in this cavity. The central unit receives and processes the data received and triggers appropriate alarms to the driver. As soon as, for one of the tires, the relative pressure becomes lower than a given threshold, for example 0.7 bar, this means that, for this tire, the tread is beginning to come into contact with the safety support, and these are then running-flat conditions. The central unit then initiates the method of detecting abnormal operating of this running-flat system. For this purpose, it periodically receives the values of internal temperature $T_n$, vehicle speed V and external temperature $T_{amb}$. Periodically, the central unit 41 calculates an estimate of the internal temperature $T_{ai,n}$ and compares this estimate to the measured value $T_n$:

$T_n - T_{ai,n}$

If the result of the comparison is greater than 10 degrees Celsius, the central unit generates an alarm and transmits it to the display 42 so that it is brought to the knowledge of the driver of the vehicle.

When such a difference is recorded, it is necessary to warn the driver of the vehicle that the running-flat system is no longer operating normally and that it is necessary for him to reduce his speed very substantially, or even to stop quickly.

Figure 9:
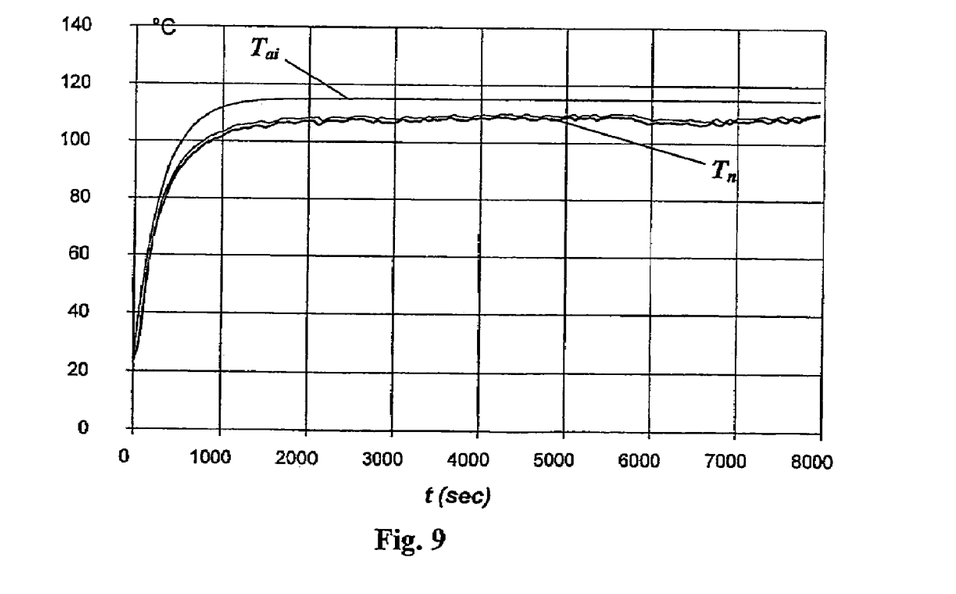
FIG. 9 presents a comparison between the changes in measured and estimated internal temperatures during analytical running.
Figure 10:
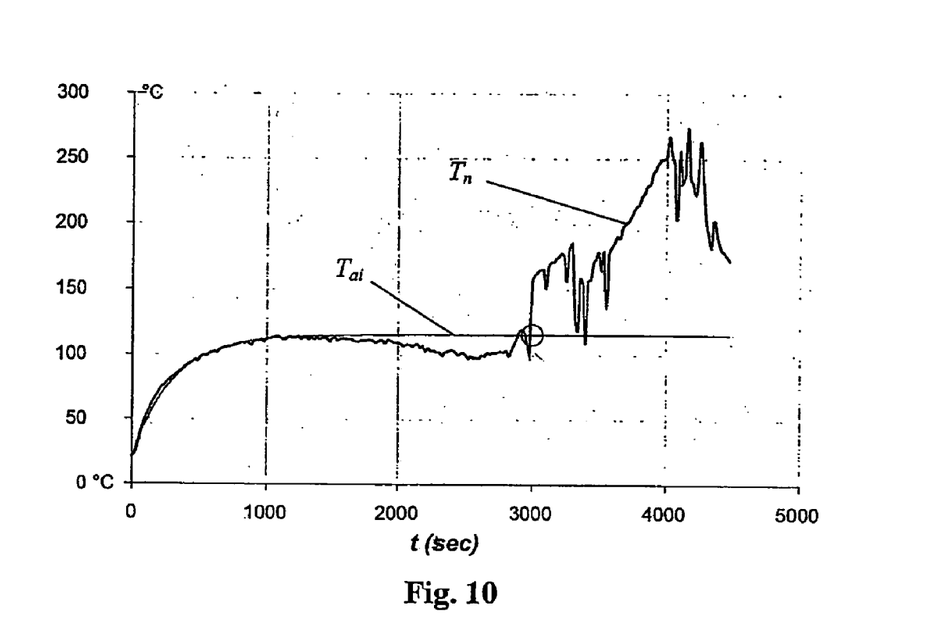
FIG. 10 presents a comparison between the changes in measured and estimated internal temperatures during analytical running similar to that in FIG. 4 with a smaller quantity of lubrication gel.
Figure 11:
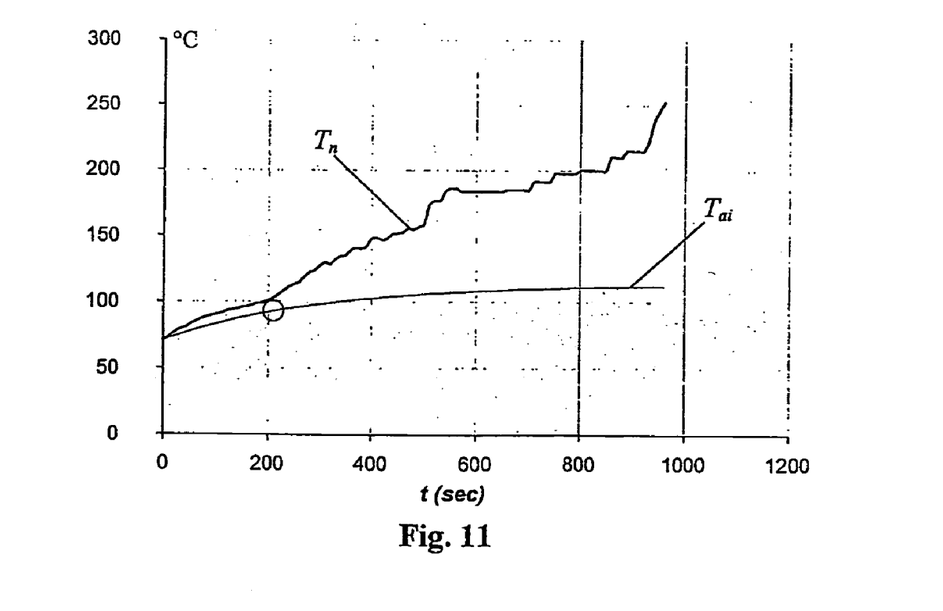
FIG. 11 is similar to FIG. 9 during analytical running with an even smaller quantity of lubrication gel.

A concrete example of an application of this method of detecting abnormal operating of the running-flat system is now described with the help of the three FIGS. 9 to 11.

FIG. 9 presents the change in the internal temperature when running under normal operating conditions of a PAX system, that is to say with in particular 25 grams of silicone lubricant introduced into the internal cavity before the test. It can be seen as before that the estimated temperature is substantially greater than the measured temperature.

FIG. 10 presents the result of a similar test in which the quantity of lubrication gel inside the cavity has been reduced to 15 grams instead of 25. In this case it can be seen that, at the end of 3000 seconds, the measured temperature exhibits significant heating and an alarm is very rapidly triggered.

FIG. 11 is a test similar to the two previous ones in which the quantity of lubrication gel is reduced further to 7.5 grams instead of 25 and 15. In this case, it can be seen that the measured temperature is always greater than the estimated temperature and the alert threshold is passed after 200 seconds of test.

These results fully show the advantage of the method of detecting abnormal operating of a running-flat system according to the invention. It is in fact necessary, for normal safety reasons, to be able to detect such an abnormal operating as soon as possible. Such an abnormal operating may be related to an overloading of the tire, to a very significant puncture hole, which could reduce the quantity of lubrication gel present in the internal cavity of the cover, or to an excessively long duration of flat running, not following the recommendations of the manufacturers of the system. This detection method is of course limited to the detection of abnormal operating which give rise to a substantial increase in the friction conditions between the safety support and the tire tread and thus a substantial increase in the internal temperature of the internal air.

The invention has been described in terms of preferred principles, embodiments, and structures for the purposes of description and illustration. Those skilled in the art will understand that substitutions may be made and equivalents found without departing, from the scope of the invention as defined by the appended claims.

What is claimed:

1. A method of estimating a temperature of air in an internal cavity of a tire, comprising:
    prior to normal operation of the tire, carrying out a series of running tests on the tire with the tire being provided with a means of measuring the temperature of the air in the cavity at given speeds V and external temperatures $T_{amb}$, the tire supporting a given load and the cavity being at a given internal relative pressure; and an adjustment is made to a function $$T_{ai}=F(V,T_{amb}),$$

which gives the temperature of the internal air $T_{ai}$ according to the parameters of speed and external temperature wherein during normal operation of the tire, the tire equips a vehicle under conditions of load and relative pressure in the cavity in accordance with the function as adjusted prior to normal operation of the tire, and the temperature of the internal air in the cavity is estimated according to the speed of the vehicle and the temperature external to the vehicle.

2. A method according to claim 1, in which the internal temperature $T_{ai}$ is given by:

$$T_{ai,n} = T_{SS} - (T_{SS} - T_{ai,n-1})\exp\left(\frac{4}{\tau}(t_n - t_{n-1})\right)$$

where $T_{ai,n}$ is an internal temperature estimated at time $t_n$, $T_{ai,n-1}$ is an internal temperature estimated at time $t_{n-1}$, Tss is an internal temperature at thermal equilibrium under the given test conditions, and $\tau$ is an adjustment coefficient; and $$T_{SS} = (a + bT_{amb})V^{(c=T_{amb}d)} + T_{amb}$$

where a,b,c and d are adjustment coefficients.

3. A method according to claim 1, in which, during tests carried out prior to normal operation, the relative pressure in the cavity corresponds to the normal relative pressure of the tire when the tire is cold.

4. A method according to claim 1, wherein the tire forms part of a running-flat system, and during tests carried out prior to normal operation the relative pressure in the cavity is substantially zero.

* * * * *